United States Patent [19]

Saville et al.

[11] Patent Number: 4,624,583
[45] Date of Patent: Nov. 25, 1986

[54] FOIL THRUST BEARING

[75] Inventors: Marshall P. Saville, Lawndale; Alston L. Gu, Rancho Palos Verdes, both of Calif.

[73] Assignee: The Garrett Corporation, Los Angeles, Calif.

[21] Appl. No.: 656,398

[22] Filed: Oct. 1, 1984

[51] Int. Cl.⁴ ............................................. F16C 32/06
[52] U.S. Cl. ................................................... 384/105
[58] Field of Search ................ 384/99, 100, 103, 104, 384/105, 106, 119, 124, 125, 215, 397

[56] References Cited

U.S. PATENT DOCUMENTS

| | | | |
|---|---|---|---|
| 3,382,014 | 5/1968 | Marley | 384/106 |
| 3,635,534 | 1/1972 | Barnett | 384/106 |
| 3,747,997 | 7/1973 | Winn | 284/104 |
| 3,809,443 | 5/1974 | Cherubim | 384/106 |
| 3,893,733 | 7/1975 | Silver et al. | 384/106 |
| 4,153,315 | 5/1979 | Silver et al. | 384/106 |
| 4,227,753 | 10/1980 | Wilcock | 384/105 |
| 4,247,155 | 1/1981 | Fortmann | 384/124 |

Primary Examiner—Stuart S. Levy
Assistant Examiner—David Werner
Attorney, Agent, or Firm—Albert J. Miller

[57] ABSTRACT

A foil thrust bearing having a thrust disk with integral compliant bearing pads or foils. A number of alternative thrust bearing disks are disclosed, each of which provides a plurality of integral, converging, bearing pads or foils having diverging ramps and/or openings therebetween.

64 Claims, 14 Drawing Figures

FOIL THRUST BEARING

BACKGROUND OF THE INVENTION

Process fluid or gas bearings are now being utilized in an increasing number of diverse applications. These fluid bearings generally comprise two relatively movable elements with a predetermined spacing therebetween filled with a fluid such as air, which, under dynamic conditions, form a supporting wedge sufficient to prevent contact between the two relatively movable elements.

More recently, improved fluid bearings, particularly gas bearings of the hydrodynamic type, have been developed by providing foils in the space between the relatively movable bearing elements. Such foils, which are generally thin sheets of a compliant material, are deflected by the hydrodynamic film forces between adjacent bearing surfaces and the foils thus enhance the hydrodynamic characteristics of the fluid bearings and also provide improved operation under extreme load conditions when normal bearing failure might otherwise occur. Additionally, these foils provide the added advantage of accommodating eccentricity of the relatively movable elements and further provide a cushioning and dampening effect.

The ready availability of relatively clean process fluid or ambient atmosphere as the bearing fluid makes these hydrodynamic, fluid film lubricated, bearings particularly attractive for high speed rotating machinery. While in many cases the hydrodynamic or self-acting fluid bearings provide sufficient load bearing capacity solely from the pressure generated in the fluid film by the relative motion of the two converging surfaces, it is sometimes necessary to externally pressurize the fluid between the bearing surfaces to increase the load carrying capability. While these externally pressurized or hydrostatic fluid bearings do increase the load carrying capacity, they do introduce the requirement for an external source of clean fluid under pressure.

In order to properly position the compliant foils between the relatively movable bearing elements a number of mounting means have been devised. In thrust bearings, it is conventional practice to mount a plurality of individually spaced foils on a foil bearing disk such as by spot welds and position the foil bearing disk on one of the bearing elements as exemplified in U.S. Pat. No. 3,635,534.

To establish stability of the foils in most of these mounting means, a substantial pre-load is required on the foil. That is, the individual foils must be loaded against the relatively movable bearing element opposed to the bearing element upon which the foils are mounted. It has been conventional to provide separate compliant stiffener elements or underfoils beneath the foils to supply this required preload as exemplified in U.S. Pat. Nos. 3,893,733 and 4,153,315.

In order to facilitate start-up and to reduce bearing wear, the individual foils may be coated with a high lubricity material such as a stratified fluorocarbon, molybdenum disulfide, graphite fluoride, or the like. The use of such coatings, while enhancing the life of the foil bearing, introduces certain operating temperature limitations thereon. As still higher temperature environments are envisioned for foil bearing operation, the temperature limitations of these coatings become critical since they cannot survive as high a temperature as the underlying metallic foil. Thus, higher temperature coatings must be developed or means found to limit the operating temperature at the coated foil surfaces. Examples of prior cooling schemes for foil bearings can be found in U.S. Pat. Nos. 4,227,753 and 4,247,155.

As more widespread use is made of foil bearings, the ease and cost of manufacturing and assembly become of more concern. Simple construction with greater ease of manufacture and shorter axial heat conduction paths is needed. Examples of recent attempts in this direction can be found in U.S. Pat. Nos. 3,747,997 and 3,809,443.

SUMMARY OF THE INVENTION

In the present invention, the thrust bearing disk is provided with integral compliant bearing pads or foils thereby eliminating the need for a plurality of individual foils which must be individually attached or mounted to the thrust bearing disk. A number of alternative thrust bearing disks are disclosed, each of which provides a plurality of integral, converging, bearing pads or foils having diverging ramps and/or openings therebetween.

DESCRIPTION OF THE PREFERRED EMBODIMENTS

Figure 1:
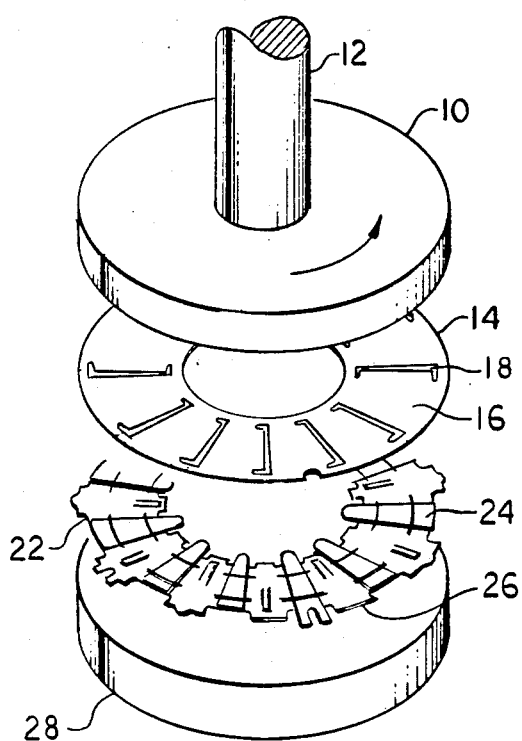
FIG. 1 is an exploded perspective view of a foil thrust bearing of the present invention.

As illustrated in FIG. 1, the thrust runner 10 including shaft 12 is rotatably supported on the thrust plate 28 by means of the thrust bearing disk 14 and thrust bearing stiffener or underspring 22. The thrust bearing disk 14 includes a plurality of integral, converging bearing pads or foils 16. The thrust bearing underspring 22 includes a plurality of upper ridges 24 and lower ridges 26 alternately disposed thereon to provide preload and support for the thrust bearing disk 14.

Figure 2:
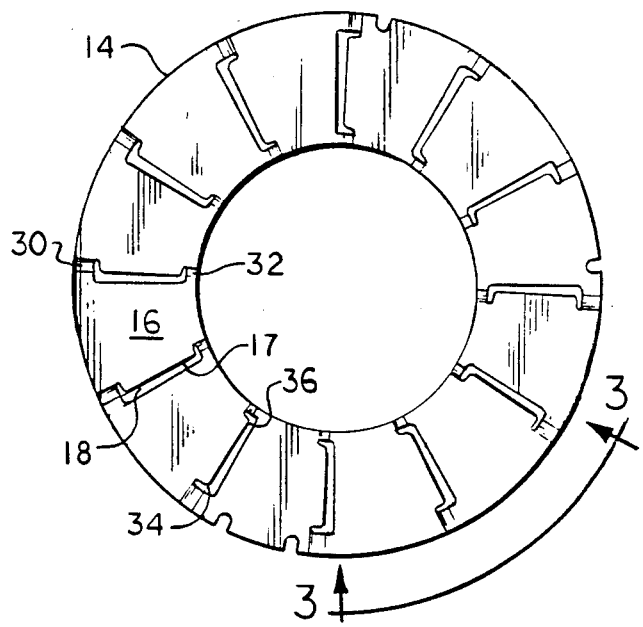
FIG. 2 is an enlarged plan view of the bearing disk of the foil thrust bearing of FIG. 1.
Figure 3:
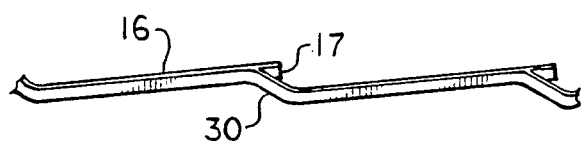
FIG. 3 is a cross-sectional view of the bearing disk of FIG. 2 taken along line 3—3 thereof.

As more fully shown in FIGS. 2 and 3, the thrust bearing disk 14 comprises a plurality of thin compliant converging surface pads or foils 16 separated by radially extending slots 18. Each of these slots 18 are generally U-shaped having an outer leg 34 and an inner leg 36. Diverging surface ramps 30 and 32 extend respectively between the outer leg 34 of the slot 18 and the outer diameter of the thrust bearing disk 14 and the inner leg 36 of the slot 18 and the inner diameter of the thrust bearing disk 14. Thus, the thrust bearing disk 14 provides alternately converging surface foils 16 and diverging surface ramps 30 and 32. With the generally U-shaped slot 18 extending between the ramps 30 and 32, the trailing edge 17 of the foil 16 continues to converge as most clearly illustrated in FIG. 3.

Figure 4:
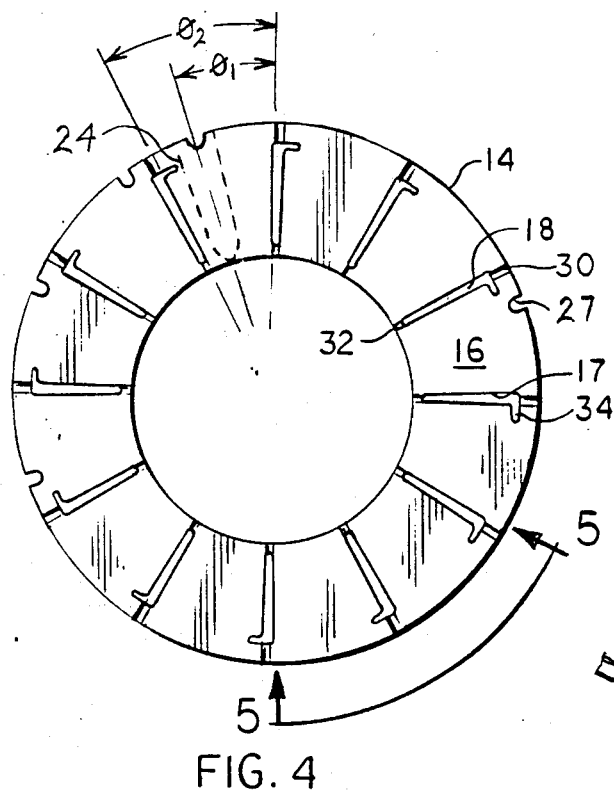
FIG. 4 is an enlarged plan view an alternate bearing disk of the present invention.
Figure 5:
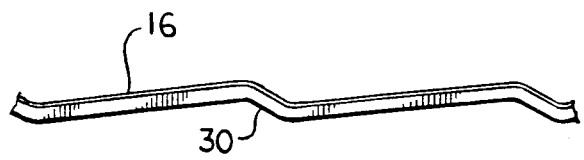
FIG. 5 is a cross-sectional view of the bearing disk of FIG. 4 taken along line 5—5 thereof.

FIGS. 4 and 5 illustrate an alternate embodiment of the thrust bearing disk in which the slots 18 are generally L-shaped having only an outer leg 34 but no inner leg 36. In addition, the ramps 30 and 32 are generally radially aligned with the slot in the embodiment of FIGS. 4 and 5. Alternately, the outer leg 34 of the slot 18 may be eliminated to leave a straight radial slot.

Also illustrated in FIG. 4 is the relative position of the upper ridges 24 of the underspring 22 with respect to the foil 16 of the thrust bearing disk 14. The angle $\phi_1$ is defined between the radial line extending from the base of the ramps 30 and 32 (the leading edge of the foil 16) and the radial centerline of the upper ridge 24. The angle $\phi_2$ is defined between the leading edge of the foil 16 and the trailing edge 17 of the foil 16. In order to provide the proper preload and support for the individual foils 16, the relationship between $\phi_1$ and $\phi_2$ should be approximately two/thirds to provide optimum results in most operating conditions. It should be understood, however, that the relationship between $\phi_1$ and $\phi_2$ range can be from approximately one half to almost one. The relationship between $\phi_1$ and $\phi_2$ should, however, never be less than one half.

Figure 6:
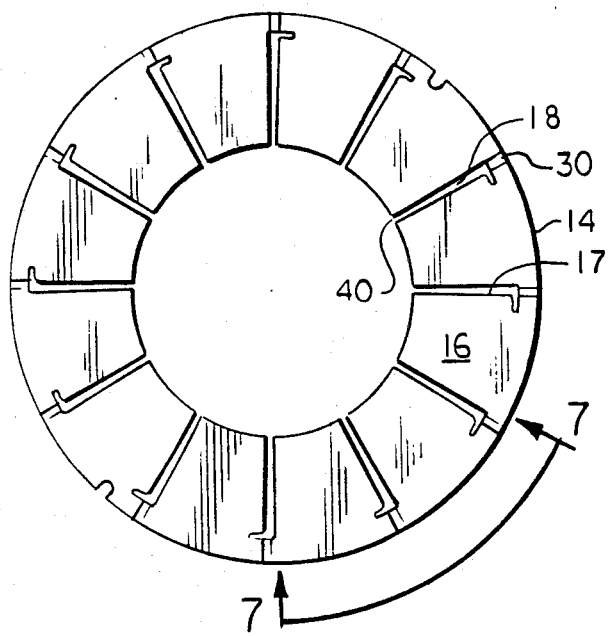
FIG. 6 is an enlarged plan view of another alternate bearing disk of the present invention.
Figure 7:
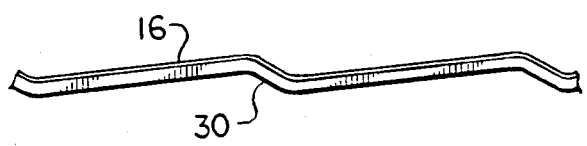
FIG. 7 is a cross-sectional view of the thrust disk of FIG. 6 taken along line 7—7 thereof.
Figure 8:
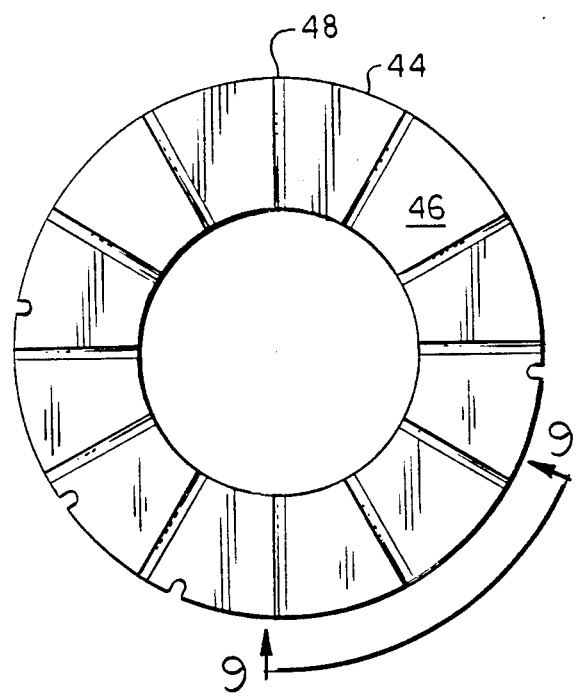
FIG. 8 is a enlarged plan view of yet another alternate foil thrust disk of the present invention.
Figure 9:
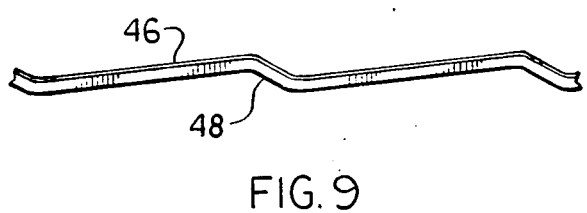
FIG. 9 is a cross-sectional view of the thrust disk of FIG. 8 taken along line 9—9 thereof.

Another alternate embodiment of the foil thrust disk 14 is illustrated in FIGS. 6 and 7. In this arrangement the L-shaped slot 18 opens directly to the inner diameter of the thrust bearing disk 14 and thus includes only a single outer ramp 30. The opening of the slot 18 at the inner diameter of the disk 14 is generally shown by numeral 40. As with respect to the embodiment of FIGS. 4 and 5, a straight radial slot can be utilized in this embodiment also.

Figure 10:
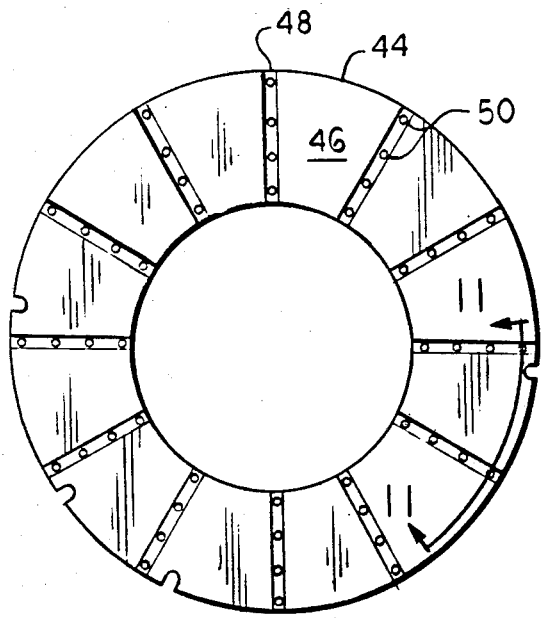
FIG. 10 is an enlarged plan view of still yet another alternate thrust disk of the present invention.
Figure 11:
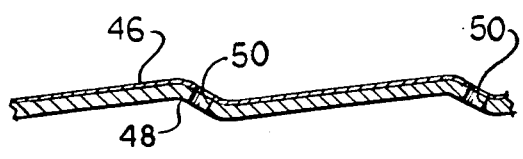
FIG. 11 is a cross-sectional view of the thrust disk of FIG. 10 taken along line 11—11 thereof.

FIGS. 8 through 11 illustrate two alternate embodiments in which the thrust bearing disk 44 includes a plurality of converging foils 46 separated by diverging ramps 48 which radially extend across the entire disk 44. In the embodiment of FIGS. 10 and 11 the ramps 48 include a plurality of cooling holes 50.

Figure 12:
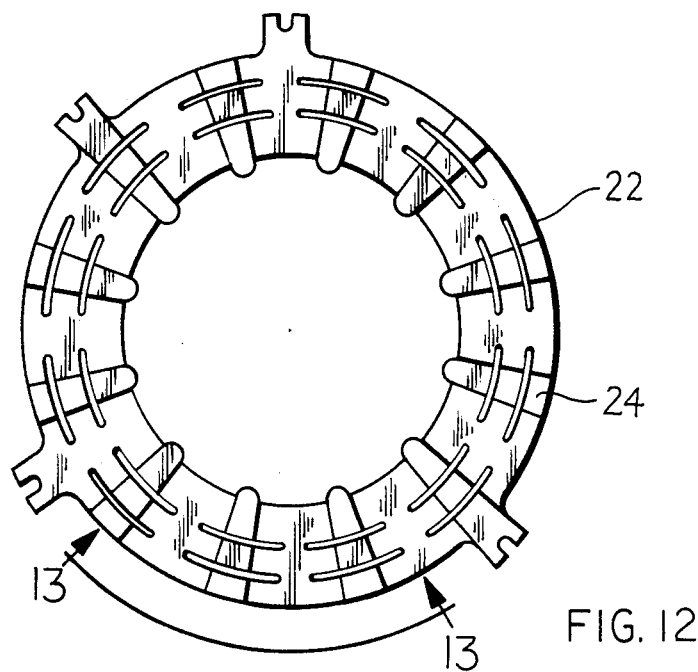
FIG. 12 is a top plan view of the underspring of the foil thrust bearing of FIG. 1.
Figure 13:
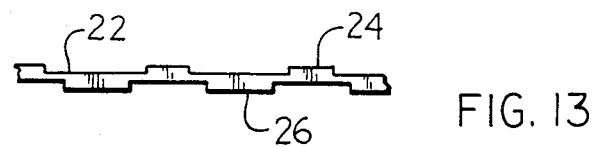
FIG. 13 is a cross-sectional view of the underspring of FIG. 12 taken along line 13—13 thereof.
Figure 14:
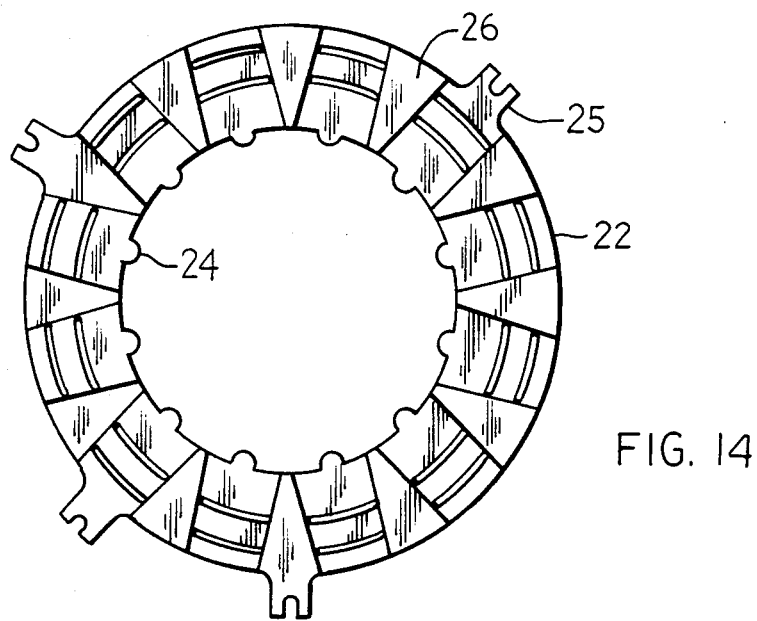
FIG. 14 is a bottom plan view of the underspring of FIG. 12.

FIGS. 12 through 14 illustrate the underspring 22 utilized in the foil thrust bearing of this invention. Besides the upper ridges 24 and lower ridges 26, also shown are the projections 25 which can be utilized to maintain the position of the underspring 22 with respect to the thrust plate 28. Similar cutouts 27 may be provided on the thrust bearing disk 14 for the same purpose.

As with respect to conventional foil bearings, the bearing surface of the individual foils may be coated with a high lubricity material. The slots in the individual thrust bearing disks may be formed by photochemical machining or mechanical punching or some other similar process. The ramps can be produced by stamping or other similar mechanical techniques.

Since a portion of the heat generated in the hydrodynamic bearing film due to viscous dissipation is conducted away through the foils and the disk, the integration of the foils and the disk provides a shorter heat conduction path when compared to individual foils mounted upon a separate disk. The simplicity in design will also provide ease in fabrication and thus lower cost while still maintaining high bearing performance.

With respect to the embodiments of FIGS. 2 and 3 and FIGS. 4 and 5, it should be recognized that both of these embodiments may include only ramps at the outer diameter with no ramps at the inner diameter. Further, there may be applications where the angle of divergence and/or the length of the inner ramps of these embodiments (and thus the ramp height) may vary from the angle of divergence and/or the length of the outer ramps. In some instances the outer ramp may be eliminated altogether with only the inner ramp remaining. Likewise, the angle of divergence and/or the length of the ramps in the embodiments of FIGS. 8 and 9 and FIGS. 10 and 11 can be varied along the radial direction.

The actual angle of divergence and height of the diverging ramps will be varied to provide for particular operating conditions. The integral foil thrust disk can provide a higher bearing load capacity since there is a greater extent of converging surface which generates the hydrodynamic pressure to support the thrust runner. The surface of the converging foils can be relatively flat or have a slight crown depending upon the desired operating characteristics. The height of the individual ramps would normally be between 0.0005 to 0.010 inches with a range of 0.001 to 0.002 preferred. The thrust bearing disk illustrated in FIGS. 6 and 7 would be thicker than the thrust bearing disk of FIGS. 2 and 3 to compensate for the loss of stiffness as a result of the opening 40. Likewise, the number of individual foils in a particular thrust bearing disk can be varied considerably depending upon the operating conditions in which the thrust bearing disk is to be utilized.

While specific embodiments of the invention have been illustrated and described, it is understood that these are provided by way example only. While the invention is shown as a thrust bearing, it should be readily apparent that it is equally applicable to a conical bearing which has a thrust component. The invention is to be construed as being limited only by the proper scope of the following claims.

We claim:

1. A fluid thrust bearing comprising:
a pair of members arranged for relative rotation with respect to one another, one of said pair of members adapted to rotatably support the other; and
a compliant foil bearing operably disposed between said pair of relatively rotatable members and mounted to one of said pair of relatively rotatable members, said complaint foil bearing comprising a thrust disk having a plurality of integral, converging surface compliant foils and a plurality of diverging surface ramps disposed generally between the integral, converging surface compliant foils, said diverging surface ramps comprising an inner ramp and an outer ramp separated by a radial slot in the thrust disk.

2. The fluid thrust bearing of claim 1 wherein said radial slot is generally U-shaped.

3. The fluid thrust bearing of claim 1 wherein said radial slot is generally L-shaped.

4. A fluid thrust bearing comprising:
a pair of members arranged for relative rotation with respect to one another, one of said pair of members adapted to rotatably support the other; and a compliant foil bearing operably disposed between said pair of relatively rotatable members and mounted to one thereof, said complaint foil bearing comprising a thrust disk having a plurality of integral, converging surface compliant foils and a plurality of diverging surface ramps disposed generally between the integral, converging surface compliant foils, and a foil stiffener disk having a plurality of upper and lower ridges alternately transversely disposed therearound disposed between the thrust disk and the one of said pair of members to which the foil bearing is mounted.

5. A fluid thrust bearing comprising:

a pair of members arranged for relative rotation with respect to one another, one of said pair of members adapted to rotatably support the other; and a compliant foil bearing operably disposed between said pair of relatively rotatable members and mounted to one thereof, said complaint foil bearing comprising a thrust disk having a plurality of integral, converging surface compliant foils and a plurality of diverging surface ramps disposed generally between the integral, converging surface compliant foils, and a foil stiffener disk having a plurality of upper and lower ridges alternately transversely disposed therearound disposed between the thrust disk and the one of said pair of members to which the foil bearing is mounted, said diverging surface ramps comprising an inner ramp and an outer ramp separated by a radial slot in the thrust disk.

6. The fluid thrust bearing of claim 5 wherein said radial slot is generally U-shaped.

7. The fluid thrust bearing of claim 5 wherein said radial slot is generally L-shaped with the base of the L-shape at the outer ramp.

8. The fluid thrust bearing of claim 4 wherein said diverging surface ramps are at the inner diameter of the thrust disk.

9. The fluid thrust bearing of claim 4 wherein said diverging surface ramps are at the outer diameter of the thrust disk.

10. A fluid thrust bearing comprising:

a pair of members arranged for relative rotation with respect to one another, one of said pair of members adapted to rotatably support the other; and a compliant foil bearing operably disposed between said pair of relatively rotatable members and mounted to one thereof, said complaint foil bearing comprising a thrust disk having a plurality of integral, converging surface compliant foils and a plurality of diverging surface ramps disposed generally between the integral, converging surface compliant foils, and a foil stiffener disk having a plurality of upper and lower ridges alternately transversely disposed therearound disposed between the thrust disk and the one of said pair of members to which the foil bearing is mounted, said diverging surface ramps at the outer diameter of the thrust disk and said disk including a plurality of radial slots extending from the ramps to the inner diameter of said disk.

11. The fluid thrust bearing of claim 5 wherein the axial height of the diverging surface ramps is generally between 0.0005 and 0.010 inches.

12. The fluid thrust bearing of claim 5 wherein the axial height of the diverging surface ramps is generally between 0.001 and 0.002 inches.

13. A fluid thrust bearing comprising:

a thrust runner;

a thrust plate to rotatably support the thrust runner; and a compliant foil bearing operably disposed between said thrust runner and said thrust plate and mounted on said thrust plate, said compliant foil bearing including a thrust disk having a plurality of integral, converging surface compliant foils disposed towards said thrust runner and a plurality of diverging surface ramps facing said thrust runner therebetween, and a foil stiffener disk having a plurality of upper and lower ridges alternately transversely disposed therearound between the thrust disk and the thrust plate.

14. A fluid thrust bearing comprising:

a thrust runner;

a thrust plate to rotatably support the thrust runner; and a compliant foil bearing operably disposed between said thrust runner and said thrust plate and mounted on said thrust plate, said compliant foil bearing including a thrust disk having a plurality of integral, converging surface compliant foils disposed towards said thrust runner and a plurality of diverging surface ramps therebetween, and a foil stiffener disk having a plurality of upper and lower ridges alternately transversely disposed therearound between the thrust disk and the thrust plate, said diverging surface ramps comprising an inner ramp and an outer ramp separated by a radial slot in the thrust disk.

15. The fluid thrust bearing of claim 14 wherein said radial slot is generally U-shaped.

16. The fluid thrust bearing of claim 14 wherein said radial slot is generally L-shaped with the base of the L-shape at the outer ramp.

17. The fluid thrust bearing of claim 13 wherein said diverging surface ramps are at the inner diameter of the thrust disk.

18. The fluid thrust bearing of claim 13 wherein said diverging surface ramps are at the outer diameter of the thrust disk.

19. A fluid thrust bearing comprising:

a thrust runner;

a thrust plate to rotatably support the thrust runner; and a compliant foil bearing operably disposed between said thrust runner and said thrust plate and mounted on said thrust plate, said compliant foil bearing including a thrust disk having a plurality of integral, converging surface compliant foils disposed towards said thrust runner and a plurality of diverging surface ramps therebetween, and a foil stiffener disk having a plurality of upper and lower ridges alternately transversely disposed therearound between the thrust disk and the thrust plate, said diverging surface ramps at the outer diameter of the thrust disk and said disk including a plurality of radial slots extending from the ramps to the inner diameter of said disk.

20. The fluid thrust bearing of claim 19 wherein the radial slot is generally L-shaped with the base of the L-shape at the ramp.

21. The fluid thrust bearing of claim 13 wherein the axial height of the diverging surface ramps is generally between 0.0005 and 0.010 inches.

22. The fluid thrust bearing of claim 13 wherein the axial height of the diverging surface ramps is generally between 0.001 and 0.002 inches.

23. The fluid thrust bearing of claim 14 wherein the axial height of the inner ramps differs from the axial height of the outer ramps.

24. The fluid thrust bearing of claim 23 wherein the axial height of the inner ramps is greater than the axial height of the outer ramps.

25. The fluid thrust bearing of claim 23 wherein the axial height of the inner ramps is less than the axial height of the outer ramps.

26. The fluid thrust bearing of claim 14 wherein one side of the radial slots is generally radially aligned with the base of the inner and outer ramps.

27. The fluid thrust bearing of claim 15 wherein the open side of the U-shaped radial slots is generally radially aligned with the top of the inner and outer ramps.

28. The fluid thrust bearing of claim 14 wherein the trailing edge of the converging surface compliant foils extends beyond the top of the inner and outer ramps.

29. The fluid thrust bearing of claim 13 wherein the relationship between the angle formed between the leading edge of the compliant foils and the radial centerline of the underlying upper ridges of the foil stiffener and the angle formed between the leading edge and trailing edge of the compliant foils is between one half to one.

30. The fluid thrust bearing of claim 13 wherein the relationship between the angle formed between the leading edge of the compliant foils and the radial centerline of the underlying upper ridges of the foil stiffener and the angle formed between the leading edge and trailing edge of the compliant foils is generally two thirds.

31. The fluid thrust bearing of claim 13 wherein each of said diverging surface ramps comprise a ramp extending from the inner diameter of said disk to the outer diameter of said disk.

32. The fluid thrust bearing of claim 31 wherein the height of the ramps varies in the radial direction.

33. The fluid thrust bearing of claim 32 wherein the height of the ramps at the outer diameter of the disk is greater than the height of the ramps at the inner diameter of the disk.

34. The fluid thrust bearing of claim 31 wherein the height of the ramps at the outer diameter of the disk is less than the height of the ramps at the inner diameter of the disk.

35. A method of rotatively supporting a thrust runner on a thrust plate comprising the steps of:
providing a compliant foil bearing between said thrust runner and said thrust plate, said compliant foil bearing including a thrust disk having a plurality of integral, converging surface compliant foils and plurality of diverging surface ramps therebetween, both said converging surface compliant foils and said diverging surface ramps disposed towards and facing said thrust runner; and
providing a stiffener disk having a plurality of upper and lower ridges alternately transversely disposed therearound between the thrust disk and the thrust plate.

36. A thrust disk for a compliant foil bearing, said thrust disk comprising:
a thin compliant ring disk;
a plurality of integral, converging surface compliant foils disposed on said disk towards said thrust runner; and
a plurality of diverging surface ramps disposed between said converging surface compliant foils, said diverging surface ramps comprising an inner ramp and an outer ramp separated by a radial slot in the thrust disk.

37. The thrust disk of claim 36 wherein said radial slot is generally U-shaped.

38. The thrust disk of claim 36 wherein said radial slot is generally L-shaped with the base of the L-shape at the outer ramp.

39. A thrust disk for a compliant foil bearing, said thrust disk comprising:
a thin compliant ring disk;
a plurality of integral, converging surface compliant foils disposed on said disk towards said thrust runner; and
a plurality of diverging surface ramps disposed between said converging surface compliant foils, said diverging surface ramps at the outer diameter of the thrust disk and said disk including a plurality of radial slots extending from the ramps to the inner diameter of said disk.

40. The thrust disk of claim 39 wherein the radial slot is generally L-shaped with the base of the L-shape at the ramp.

41. The thrust disk of claim 36 wherein the axial height of the diverging surface ramps is generally between 0.0005 and 0.010 inches.

42. The thrust disk of claim 36 wherein the axial height of the diverging surface ramps is generally between 0.001 and 0.002 inches.

43. The thrust disk of claim 36 wherein the axial height of the inner ramps differs from the axial height of the outer ramps.

44. The thrust disk of claim 36 wherein the axial height of the inner ramps is greater than the axial height of the outer ramps.

45. The thrust disk of claim 36 wherein the axial height of the inner ramps is less than the axial height of the outer ramps.

46. The thrust disk of claim 36 wherein one side of the radial slots is generally radially aligned with the base of the inner and outer ramps.

47. The thrust disk of claim 37 wherein the open side of the U-shaped radial slots is generally radially aligned with the top of the inner and outer ramps.

48. The thrust disk of claim 36 wherein the trailing edge of the converging surface compliant foils extends beyond the top of the inner and outer ramps.

49. A thrust disk for a compliant foil bearing, said thrust disk comprising:
a thin compliant ring disk;
a plurality of integral, converging surface compliant foils disposed on said disk; and
a plurality of diverging surface ramps disposed between said converging surface compliant foils, both said converging surface compliant foils and said diverging surface ramps facing in the same direction, said diverging surface ramps comprising a ramp extending from the inner diameter of said disk to the outer diameter of said disk and the height of the ramps varies in the radial direction.

50. The thrust disk of claim 49 wherein the height of the ramps at the outer diameter of the disk is greater than the height of the ramps at the inner diameter of the disk.

51. The thrust disk of claim 49 wherein the height of the ramps at the outer diameter of the disk is less than the height of the ramps at the inner diameter of the disk.

52. The fluid thrust bearing of claim 31 wherein the ramps include a plurality of radially spaced openings therein.

53. The fluid thrust bearing of claim 1 wherein said diverging surface ramps are at the outer diameter of the thrust disk and said disk includes a plurality of radial slots extending from the ramps to the inner diameter of said disk.

54. The fluid thrust bearing of claim 53 wherein the radial slot is generally L-shaped with the base of the L-shape at the ramp.

55. The fluid thrust bearing of claim 1 wherein the axial height of the inner ramps differs from the axial height of the outer ramps.

56. The fluid thrust bearing of claim 1 wherein one side of the radial slots is generally radially aligned with the base of the inner and outer ramps.

57. The fluid thrust bearing of claim 1 wherein the open side of the U-shaped radial slots is generally radially aligned with the top of the inner and outer ramps.

58. The fluid thrust bearing of claim 1 wherein the trailing edge of the converging surface compliant foils extends beyond the top of the inner and outer ramps.

59. The fluid thrust bearing of claim 4 wherein said diverging surface ramps are at the inner diameter of the thrust disk and said disk includes a plurality of radial slots extending from the ramps to the outer diameter of said disk.

60. A fluid thrust bearing comprising:
a thrust runner;
a thrust plate to rotatably support the thrust runner; and
a compliant foil bearing operably disposed between said thrust runner and said thrust plate and mounted on said thrust plate, said compliant foil bearing including a thrust disk having a plurality of integral, converging surface compliant foils disposed towards said thrust runner and a plurality of diverging surface ramps therebetween with the surface of the ramps inclined in a direction which slopes oppositely to the direction of inclination of the surface of the compliant foils, and a foil stiffener disk having a plurality of upper and lower ridges alternately transversely disposed therearound between the thrust disk and the thrust plate.

61. A method of fabricating a thrust disk for a compliant foil bearing comprising the steps of:
forming a thin compliant ring disk; and
forming a plurality of radially extending ramps around the disk whereby a converging surface compliant foil is formed between adjacent ramps, said radially extending ramps comprising an inner ramp and an outer ramp separated by a radial slot in the thrust disk, the surface of the ramps inclined in a direction which slopes oppositely to the direction of inclination of the surface of the compliant foils.

62. The method of claim 35 wherein said diverging surface ramps comprise an inner ramp and an outer ramp separated by a radial slot in the thrust disk.

63. A method of fabricating a thrust disk for a compliant foil bearing comprising the steps of;
forming a thin compliant ring disk; and
forming a plurality of radially extending ramps around the disk whereby a converging surface compliant foil is formed between adjacent ramps, said radially extending ramps at the outer diameter of the thrust disk and said disk including a plurality of radial slots extending from the ramps to the inner diameter of said disk, the surface of the ramps inclined in a direction which slopes oppositely to the direction of inclination of the surface of the compliant foils.

64. The method of claim 35 wherein said diverging surface ramps are at the outer diameter of the thrust disk and said disk includes a plurality of radial slots extending from the ramps to the inner diameter of said disk.

* * * * *

UNITED STATES PATENT AND TRADEMARK OFFICE
CERTIFICATE OF CORRECTION

PATENT NO. : 4,624,583
DATED     : November 25, 1986
INVENTOR(S) : Marshall P. Saville & Alston Lee-Van Gu It is certified that error appears in the above-identified patent and that said Letters Patent is hereby corrected as shown below:

Claim 34, line 1, change "31" to --32--

Signed and Sealed this

Twenty-fourth Day of February, 1987

Attest:

DONALD J. QUIGG

*Attesting Officer*    *Commissioner of Patents and Trademarks*